United States Patent [19]

Nakagawa et al.

[11] Patent Number: 4,683,966

[45] Date of Patent: Aug. 4, 1987

[54] WEIGHING SYSTEM

[75] Inventors: Yukio Nakagawa, Kyoto; Yukio Kakita; Kazumi Kitagawa, both of Shiga, all of Japan

[73] Assignee: Ishida Scales Mfg. Co., Ltd., Kyoto, Japan

[21] Appl. No.: 778,504

[22] Filed: Sep. 20, 1985

[30] Foreign Application Priority Data

Sep. 20, 1984 [JP] Japan ............................ 59-143245[U]
Sep. 20, 1984 [JP] Japan ............................ 59-143246[U]
Apr. 25, 1985 [JP] Japan ................................. 60-87456

[51] Int. Cl.$^4$ .................... G01G 19/22; G01G 21/28; B65G 27/28
[52] U.S. Cl. ..................................... 177/25; 177/58; 177/DIG. 11; 198/760
[58] Field of Search ........... 177/25, 58, 244, DIG. 11; 198/760, 767

[56] References Cited

U.S. PATENT DOCUMENTS

| | | |
|---|---|---|
| 4,206,822 | 6/1980 | Mazzucchelli . |
| 4,281,729 | 8/1981 | Farley et al. . |
| 4,421,185 | 12/1983 | Koto et al. ............................ 177/25 |
| 4,483,462 | 11/1984 | Heintz . |
| 4,497,385 | 2/1985 | Sashiki ............................ 177/244 X |
| 4,569,405 | 2/1986 | Oshima ................................. 177/25 |

FOREIGN PATENT DOCUMENTS 0074283 3/1983 European Pat. Off. .
0085446 8/1983 European Pat. Off. .

Primary Examiner—George H. Miller, Jr.
Attorney, Agent, or Firm—Staas & Halsey

[57] ABSTRACT

A weighing system includes a weighing apparatus composed of distributive table, a plurality of radial supply troughs disposed around the peripheral edge of the distributive table for being supplied with articles to be weighed from the distributive table, a plurality of weighing units supporting respective openable weighing hoppers for weighing articles supplied to the weighing hoppers, at least one of the distributive table and the radial supply troughs having a slide surface slanted radially outwardly to a large extent for allowing the articles to slide thereon, each of the radial supply troughs having a radially outer distal end disposed over one of the weighing hoppers, and a collection chute disposed below the weighing hoppers. A liquid drain device is disposed at the distal end of each of the radial supply troughs. A shutter is interposed between each of the radial supply troughs and a corresponding one of the weighing hoppers. The radial supply troughs are supported on respective vibrators which are supported by detachable coil springs on a base plate. The weighing apparatus also includes a device for transmitting an output signal through space when the articles supplied to the distributive table reach a prescribed amount.

15 Claims, 14 Drawing Figures

WEIGHING SYSTEM

BACKGROUND OF THE INVENTION

The present invention relates to a weighing system for automatically and successively weighing articles up to a prescribed weight.

Weighing systems have a combinatorial weighing apparatus and a feeder for supplying articles to the combinatorial weighing apparatus.

The combinatorial weighing apparatus operates by distributing articles to a plurality of weighing machines arranged in a circular pattern, for example, around an article pooling or storage unit to enable the weighing machines to weigh the supplied articles, effecting a combinatorial weighing process based on the weights measured by the respective weighing machines to select an optimum added weight combination which is equal to or closest to a target weight within a prescribed error range, and discharging the articles from those weighing machines which give the optimum weight combination for thereby obtaining the articles with the total weight equal or closest to the target weight.

The article feeder is in the form of a bucket conveyor or a belt conveyor disposed closely to the combinatorial weighing apparatus for supplying the articles to the article storage unit. The article feeder does not continuously supply the articles to the article storage unit, but usually supplies the articles only when the quantity of articles pooled on the article storage unit is reduced below a predetermined level for preventing articles from being excessively supplied to the article storage unit. The weighing apparatus has a detector for detecting the amount of articles on the article storage unit. When the detector detects a prescribed reduction in the quantity of artices on the article storage unit, the article feeder is actuated to feed articles in the article storage unit. Heretore, the detector and the article feeder are coupled by an electric cord. This however has led to the following drawbacks:

The weighing apparatus and the article feeder are installed on a floor while they are interconnected by the electric cord. When the weighing apparatus and the article feeder or their surroundings are to be cleaned, the weighing apparatus or the article feeder is required to be individually moved. At this time, the electric cord becomes an obstacle to such movement of the weighing apparatus or the article feeder, or may be cut off by forcibly moving the weighing apparatus or the article feeder one from the other if the operator happens to foreget to disconnect the electric cord. Where food articles are weighed by the weighing system, the weighing apparatus and the article feeder will be washed with water for sanitary purpose after a desired sequence of weighing operation is over. When washing the weighing apparatus and the article feeder are washed with water, the connectors used for connecting the electric cord are covered with water and corroded, resulting in reduced electric conductivity.

The weighing apparatus includes a distributive or dispersive table surrounded by the weighing machines for supplying articles to the weighing machines. A plurality of vibratory supply troughs are disposed radially outwardly of the distributive table for supplying the articles which have been charged onto the table through the supply troughs into the corresponding weighing machines. Since the supply troughs have not been fixed to an attachment base, however, the efficiencies for cleaning the supply troughs and for inspecting and adjusting the vibrators have heretofore been poor. To solve this problem, the applicant has proposed a supply trough detachable from an attachment base as disclosed in Japanese Laid-Open Utility Model Publication No. 59-62516. The disclosed supply trough is mounted on a vibrator supported by a plurality of springs on a base plate. The supply trough and the vibrator are detachably attached to the attachment base by engaging a pin on the attachment base in an attachment hole defined in the base plate. With this disclosed arrangement, the supply trough can easily be detached from the attachment base as when the supply trough is to be washed, and hence can efficiently be washed.

In the disclosed supply trough, the springs interposed between the base plate and the vibrator comprises leaf springs which are however liable to be easily broken as they are not durable enough. If more durable coil springs were employed, then the following shortcomings would arise:

For connecting the coil spring ends to the upper surface of the base plate and the lower surface of the vibrator with a bolt, the bolt would be inserted through the coil spring. However, it would be extremely difficult to connect the coil spring ends to the upper surface of the base plate and the lower surface of the vibrator with the bolt. One solution to this problem would be to couple the upper end of the coil spring to the lower surface of the vibrator with the bolt, while keeping the lower end of the coil spring in engagement with the upper surface of the base plate with a pin or the like. With this fastening arrangement, however, the vibrator and the base plate would be separated from each other, and for attaching and detaching the supply trough to and from the attachment base, both of the base plate and the vibrator would have to be attached and detached. As a consequence, it would be highly troublesome to attach and detach the supply trough. If the coil spring ends were joined in some way to the upper surface of the base plate and the lower surface of the vibrator, then it would be difficult to disassemble the supply trough. It would also be difficult to adjust the height and inclination of the supply trough for smooth delivery of articles to be weighed therethrough or for avoiding interference with adjacent devices. More specifically, such height and inclination adjustment is normally effected by positioning a shim of a suitable thickness between the upper end of the spring and the lower surface of the vibrator or the lower end of the spring and the upper surface of the base plate. With the spring ends joined to the lower surface of the vibrator and the upper surface of the base plate, however, difficulty would be experienced in attaching and removing such a shim.

In case articles to be weighed are solid materials of fixed shape such as dried macaroni tubes or potate chips, they are prevented from being stagnant or attached as they slide along the distributive table and the supply troughs since the coefficient of friction of the articles are substantially constant. Accordingly, the weighing cycle and the opening and closing cycle of pool hoppers and weighing hoppers can remain substantially constant.

Where articles to be weighed are sticky materials such as pickled vegetables or syruped foods, or soft materials such as dried fruits or cheese, the articles are more likely to get stuck to the distributive table and the radial trough surfaces as they slide along. As a consequence, it takes a longer period time for these materials to slide along the distributive table and the supply troughs, and the articles are supplied randomly to the pool hoppers. Thus, the supply of the articles to the weighing hoppers downstream of the pool hoppers is also apt to become unstable, resulting in unstable weighing cycles. It is also difficult to control the timing of the supply of the articles from the supply troughs to the pool hoppers. Another problem with the sticky materials such as pickled vegetables or syruped foods is that the liquid also supplied with the articles along the distributive table and the supply troughs cannot be removed but is charged also into the pool hoppers and the weighing hoppers, resulting in different weights of packaged articles or goods.

SUMMARY OF THE INVENTION

It is an object of the present invention to provide a novel weighing system for allowing a weighing apparatus thereof to be locally cleaned easily.

Another object of the present invention is to provide a weighing system wherein when the quantity of articles stored in the article pooling unit of a weighing apparatus thereof is reduced, an article feeder is activated to supply articles to the article pooling unit, the weighing system having no electric cord for transmitting a signal indicative of such a reduction of the quantity of articles in the article cooling unit to the article feeder, with the result that when the weighing apparatus and the article feeder are to be cleaned, they can freely be moved independently of each other for increased cleaning efficiency and no electric cord would be cut off.

Still another object of the present invention is to provide a weighing system in which each supply trough is detachably mounted on an attachment base by coil springs interposed between a base plate and a vibrator, the coil springs being prevented from breakage, and the supply troughs can easily be disassembled and assembled and shims can easily be attached and detached for adjusting the height and inclination of the supply troughs, without lowering the efficiency with which the supply troughs are attached to and detached from the attachment base.

A still further object of the present invention is to provide a weighing system having no pool hoppers for assuring smooth sliding movement of sticky articles down to weighing hoppers to avoid unstable sliding movement arising from the sticky nature of the articles, and also having weighing hoppers capable of dynamic weighting operation for the articles supplied from a distributive table through supply troughs to the weighing hoppers for thereby sufficiently performing combinatorial weighing operation.

According to the present invention, the above objects can be achieved by a weighing system comprising a distributive table, a plurality of radial supply troughs disposed around the peripheral edge of the distributive table for being supplied with articles to be weighed from the distributive table, a plurality of weighing units supporting respective openable weighing hoppers for weighing articles supplied to the weighing hoppers, at least one of the distributive table and the radial supply troughs having a slide surface slanted radially outwardly to a large extent for allowing the articles to slide thereon, each of the radial supply troughs having a radially outer distal end disposed over one of the weighing hoppers, and a collection chute disposed below the weighing hoppers.

According to the present invention, there is also provided a weighing system comprising a distributive table, a plurality of radial supply troughs disposed around the peripheral edge of the distributive table for being supplied with articles to be weighed from the distributive table, a plurality of weighing units supporting respective openable weighing hoppers for weighing articles supplied to the weighing hoppers, at least one of the distributive table and the radial supply troughs having a slide surface slanted radially outwardly to a large extent for allowing the articles to slide thereon, each of the radial supply troughs having a radially outer distal end disposed over one of the weighing hoppers, a first liquid drain device disposed at the distal end of each of the radial supply troughs, a shutter interposed between the distal end of each of the radial supply troughs and a corresponding one of the weighing hoppers, a stand including a second liquid drain device for draining a liquid from the shutter and the radial supply troughs, and a collection chute disposed below the weighing hoppers.

According to the present invention, there is also provided a weighing system comprising a distributive table, a plurality of radial supply troughs disposed around the peripheral edge of the distributive table for being supplied with articles to be weighed from the distributive table, a plurality of weighing units supporting respective openable weighing hoppers for weighing articles supplied to the weighing hoppers, at least one of the distributive table and the radial supply troughs having a slide surface slanted radially outwardly to a large extent for allowing the articles to slide thereon, each of the radial supply troughs having a radially outer distal end disposed over one of the weighing hoppers, a collection chute disposed below the weighing hoppers, an attachment base supporting at least the distributive table, the radial supply troughs, and the weighing units, a base plate detachably mounted on the attachment base, a plurality of coil springs disposed on the base plate, a plurality of vibrators supported on the coil springs, the radial supply troughs being supported respectively on the vibrators, and the coil springs having ends separable from at least one of the upper surface of the base plate and the lower surface of each of the vibrators.

According to the present invention, there is also provided a weighing system comprising a weighing apparatus and an article feeder for feeding articles to be weighed to the weighing apparatus, the weighing apparatus being composed of a distributive table, a plurality of radial supply troughs disposed around the peripheral edge of the distributive table for being supplied with articles to be weighed from the distributive table, a plurality of weighing units supporting respective openable weighing hoppers for weighing articles supplied to the weighing hoppers, at least one of the distributive table and the radial supply troughs having a slide surface slanted radially outwardly to a large extent for allowing the articles to slide thereon, each of the radial supply troughs having a radially outer distal end disposed over one of the weighing hoppers, a collection chute disposed below the weighing hoppers, first means for detecting the amount of articles pooled on the distributive table and transmitting an output signal through space when the amount of articles as detected is reduced below a prescribed level, and the article feeder having second means for receiving the output signal from the first means to actuate the article feeder.

According to the present invention, there is also provided a weighing system comprising a weighing apparatus and an article feeder for feeding articles to be weighed to the weighing apparatus, the weighing apparatus being composed of a distributive table, a plurality of radial supply troughs disposed around the peripheral edge of the distributive table for being supplied with articles to be weighed from the distributive table, a pluarlity of weighing units supporting respective openable weighing hoppers for weighing articles supplied to the weighing hoppers, at least one of the distributive table and the radial supply troughs having a slide surface slanted radially outwardly to a large extent for allowing the articles to slide thereon, each of the radial supply troughs having a radially outer distal end disposed over one of the weighing hoppers, a collection chute disposed below the weighing hoppers, first means disposed above the distributive table for transmitting an output signal through space, and the article feeder having second means for receiving the output signal from the first means to actuate the article feeder when the amount of articles pooled on the distributive table is reduced below a prescribed level.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a cross-sectional view taken along line line VII—VII of FIG. 3;

FIG. 8 is a cross-sectional view taken along line line VIII—VIII of FIG. 7;

FIG. 9 is a perspective view of a spring engagement member;

FIG. 10 is a fragmentary side elevational view of a weighing apparatus incorporated in a weighing system according to another embodiment;

FIG. 11 is a side elevational view of a shutter opening and closing mechanism in the weighing apparatus of FIG. 10;

FIG. 12 is a fragmentary perspective view of a tray;

FIG. 13 is an enlarged fragmentary side elevational view of a pivoted portion of a stand of the shutter opening and closing mechanism; and FIG. 14 is a front elevational view of the pivoted portion of FIG. 13.

DESCRIPTION OF THE PREFERRED EMBODIMENTS

Figure 1:
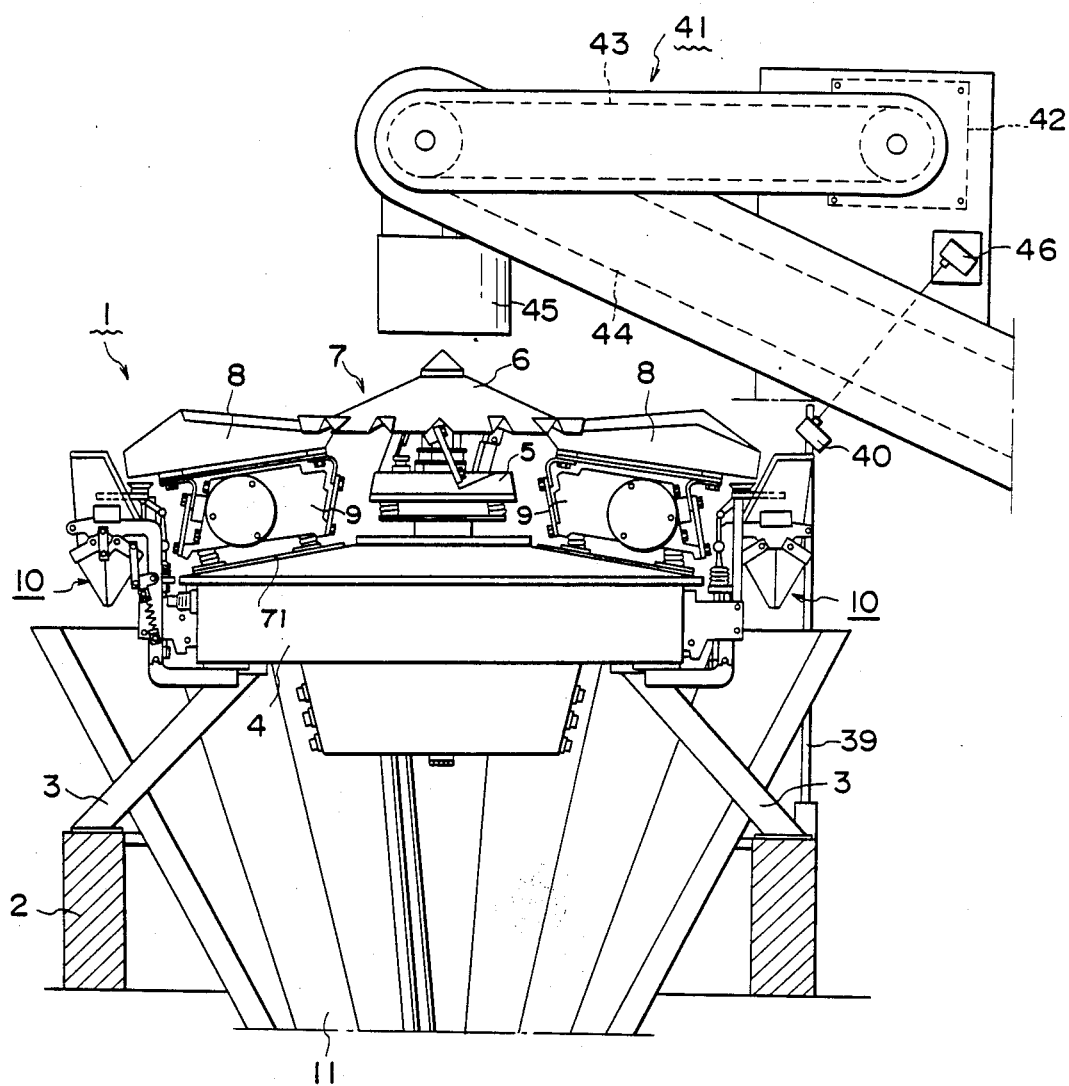
FIG. 1 is a side elevational view of a weighing system according to an embodiment composed of a first group of the embodiments of the present invention.
Figure 2:
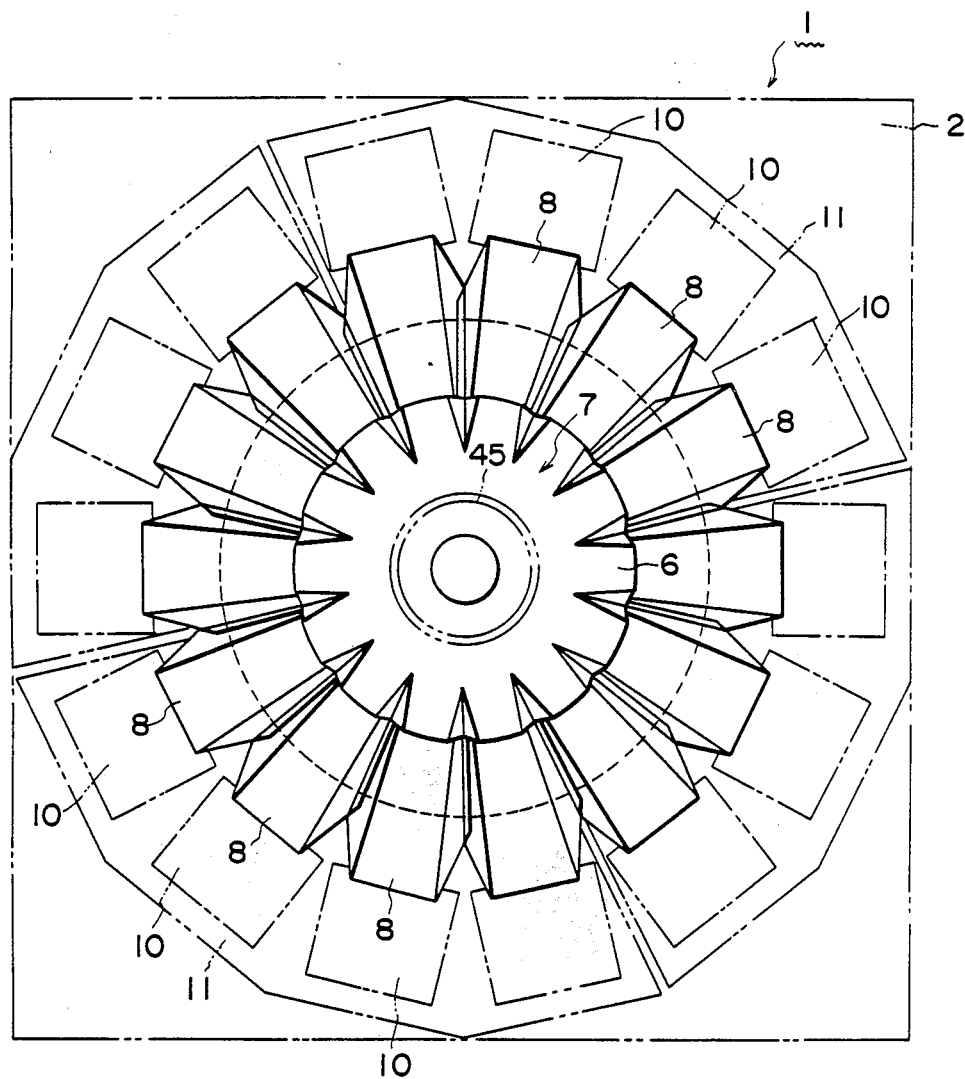
FIG. 2 is a plan view of a weighing apparatus of the weighing system.

As shown in FIG. 1, a weighing system of the present invention includes a combinatorial weighing apparatus 1 comprising a base 2, a support table 4 mounted by a plurality of legs 3 on the base 2, a distributive or dispersive table 6 mounted centrally on the support table 4 by a vibrator 5 and serving as an article pooling unit 7, a plurality (fourteen in the illustrated embodiment) of radial supply troughs 8 supported by a plurality of vibrators 9 on the support table 4 and positioned around the distributive table 6, a plurality of weighing units 10 disposed below the distal ends of the supply troughs 8, respectively, and a collection chute 11 of stainless steel in the form of an inverted cone located below the weighing units 10.

Figure 3:
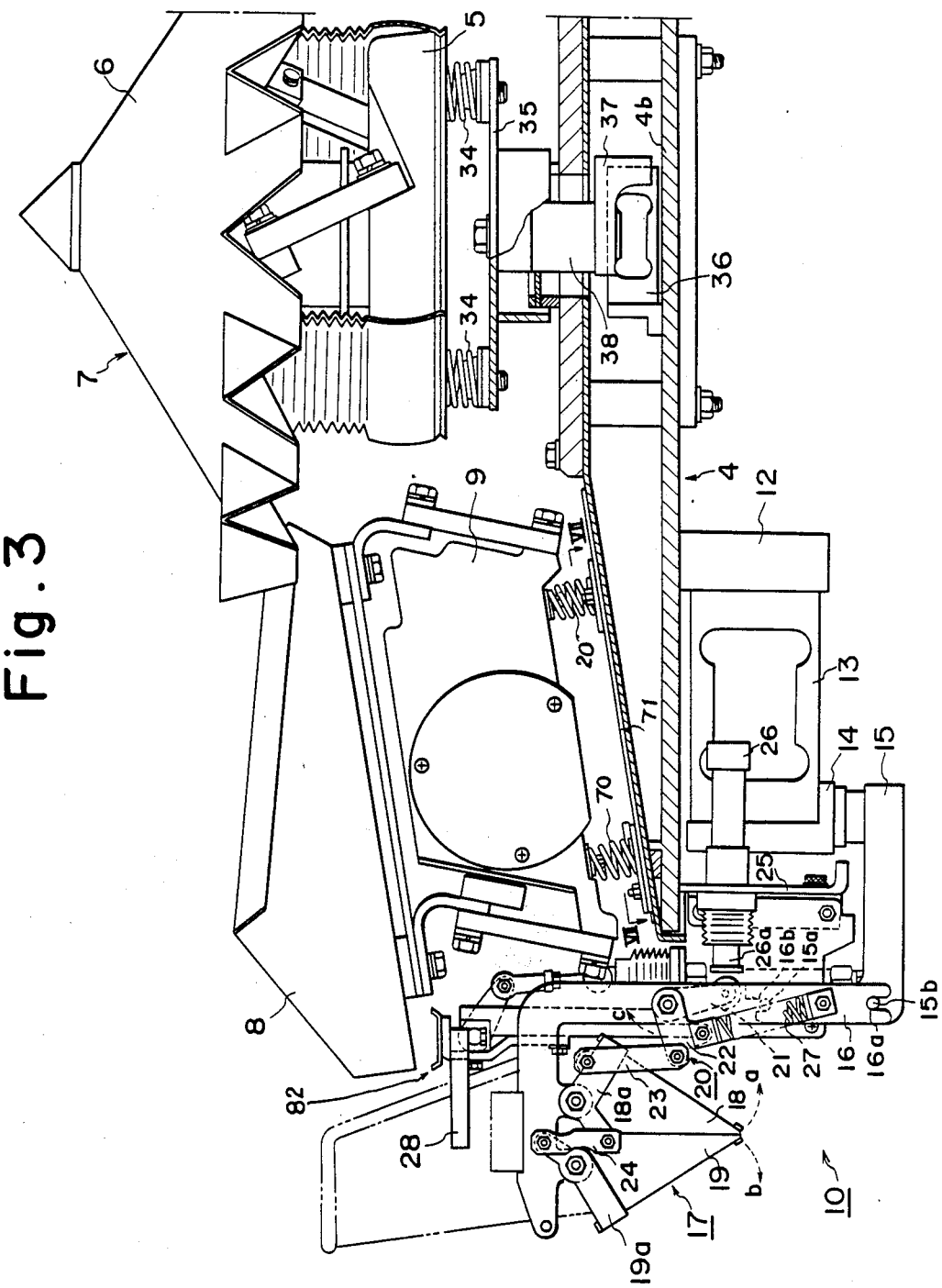
FIGS. 3 and 4 are enlarged fragmentary side elevational views of the weighing apparatus.

As illustrated in FIGS. 1 and 3, each of the weighing units 10 is composed of a load cell 13 having one end secured by a bracket 12 to the lower surface of the periphery of the support table 4, and a weighing hopper 17 attached to the other end of the load cell 13 by a bracket 14 and first and second support members 15, 16. The weighing hopper 17 is positioned below the distal end of the corresponding supply trough 8. The weight of articles charged from the supply trough 8 into the weighing hopper 17 is detected by the load cell 13. The first support member 15 fixed by the bracket 14 to the load cell 13 has a recess 15a defined in the upper end thereof and an engaging pin 15b disposed below the recess 15a. The second support member 16 by which the weighing hopper 17 is supported has a recess 16a defined in the lower end thereof and an engaging pin 16b disposed above the recess 16a. The engaging pin 16b engages in the recess 15a, and the engaging pin 15b engages in the recess 16a, such that the first and second support members 15, 16 are separably coupled to each other to allow the weighing hopper 17 can be detached from the load cell 13 or the support table 4.

Figure 4:
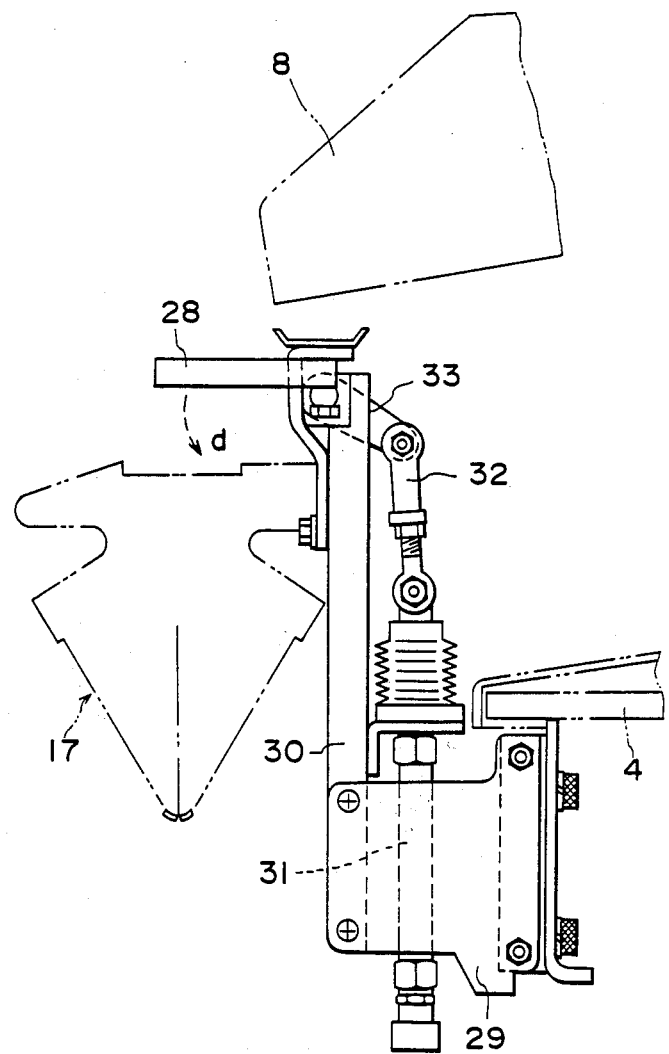

The weighing hopper 17 is composed of first and second gates 18, 19 havng upper ends pivotally coupled to the second support member 16 and also connected to a link mechanism 20 for turning the first and second gates 18, 19 in the directions of the arrows a, b from the illustrated closed position. The link mechanism 20 comprises a first link 21 having one end pivotally connected to the second support member 16, a second link 22 having one end pivotally connected to the second support member 16 for angular movement with the first link 21, a third link 23 connecting the second link 22 and the frame 18a of the first gate 18, and a fourth link 24 connecting the frames 18a, 19a of the first and second gates 18, 19. The first link 21 has a distal end positioned in confronting relation to the distal end of the piston rod 26a of a cylinder 26 mounted by a bracket 25 to the lower surface of the support table 4. When the piston rod 26a is projected, the first and second links 21, 22 are turned in the direction of the arrow c against the bias of a spring 27 to cause the third link 23 to turn the first gate 18 in the direction of the arrow a and also to cause the fourth link 24 to turn the second gate 19 in the direction of the arrow b. A shutter 28 is disposed-between the distal end of the supply trough 8 and the weighing hopper 17 disposed therebelow for preventing unwanted articles from being charged from the supply trough 8 into the weighing hopper 17. As shown in FIG. 4, the shutter 28 is pivotally supported on the upper end of a stand 30 fixed at its lower end to a support member 29. The shutter 28 can be angularly moved downwardly in the direction of the arrow d from the illustrated position by an air cylinder 31 through a rod 32 and a lever 33, the cylinder 31 being mounted on the stand 30.

As shown in FIG. 3, the vibrator 5 for vibrating the distributive table 6 is mounted on an attachment base 35 by springs 34. The attachment base 35 is coupled by coupling members 37, 38 to one end of a load cell 36 with its other end fixed to a bottom plate 4a of the support table 4. Thus, the weights of the attachment base 35, the vibrator 5, and the distributive table 6, as well as the weight of articles pooled in the article pooling unit 7 or the distributive table 6 are borne by the load cell 36. Since the weights of the attachment base 35, the vibrator 5, and the distributive table 6 are constant, the load cell 36 can measure the weight of the articles in the article pooling unit 7. When the weight of the articles is lowered below a predetermined level, light is emited from a light-emitting element 40 (FIG. 1) such as a light-emitting diode attached to a post 39 mounted on the base 2.

As shown in FIG. 1, an article feeder 41 is disposed above the weighing apparatus 1. The article feeder 41 has a belt 44 drivable by a motor 42 through a motor-driven transmission member such as a chain for transporting articles supplied on the belt 44 from a supply unit (not shown) toward a position over the weighing apparatus 1. The articles thus transported are then charged from an article charger 45 onto the distributive table 6 or the article pooling unit 7. The article feeder 41 has a light detector 46 such as a phototransistor disposed in confronting relation to the light-emitting element 40 of the weighing apparatus 1. When the light detector 46 detects light emitted from the light-emitting element 40, the motor 42 is energized to actuate the belt 44.

In operation, articles charged into the article pooling unit 7 by the article feeder 41 are successively supplied from the distributive table 6 through the supply troughs 8 into the weighing hoppers 17 of the respective weighing units 10 when the distributive table 6 is vibrated by the vibrator 5 and the supply troughs 8 are vibrated by the vibrators 9. The articles supplied to the weighing hoppers 17 are weighed by the load cells 13 of the weighing units 10. The weighing appratus 1 has a control unit (not shown) for effecting a combinatorial arithmetic operation based on the weights detected by the load cells 13 and selecting an optimum added weight combination which is equal to a prescribed target weight or close to the target weight within a predetermined error range. Then, the articles are discharged from the weighing hoppers 17 of those weighing units 10 which give such an optimum weight combination by operating the cylinder 26 (FIG. 3) to cause the link mechanism 20 to turn the gates 18, 19 of the weighing hopper 17. The discharged articles are collected by the collection chute 11 into a mass of articles which has a total weight equal or close to the target weight. The shutters 28 disposed above the respective weighing hoppers 17 are actuated by the cylinder 31 to move downwardly, and at the same time the vibrators 9 for the corresponding supply troughs 8 are operated to supply articles from the article pooling unit 7 through the supply troughs 8 for a next cycle of weighing operation. When the weight of articles charged into the weighing hoppers 17 reaches a prescribed level, the corresponding load cells 13 produce signals to stop supplying articles to the weighing hoppers 17. Since a small amount of articles tends to be charged into the weighing hoppers 17 after the signals are produced from the load cells 13 to stop supplying the articles, all of the charged articles are weighed again and the above combinatorial arithmetic operation is performed on the measured weights. As an alternative, the supply of articles can be stopped upon elapse of a predetermined period of time after the articles have started being supplied.

As the aforesaid cycle of weighing operation is repeated, the amount of articles pooled in the article poolin unit 7 is gradually reduced. When the amount of articles is reduced to a level smaller than a prescribed weight, the light-emitting element 40 is energized in response to a signal produced by the load cell (FIG. 3) which measures the weight of the articles for emitting light toward the light detector 46 of the article feeder 41. When the emitted light impinges on the light detector 46, the motor 42 of the article feeder 41 is energized to drive the belt 44 through the power transmission member 43 to supply articles from the article feeder 41 to the article pooling unit 7 until the articles are pooled up to a predetermined quantity.

The article feeder 41 is operated dependent on the condition of the weighing apparatus 1 as described above. Since the signal for operating the article feeder 41 is a light signal generated by the light-emitting element 40 of the weighing apparatus 1, it is possible to separate the weighing apparatus 1 mechanically from the article feeder 41. Therefore, the weighing apparatus 1 and the article feeder 41 can freely be moved around irrespectively of each other when they, or their surroundings are to be cleaned. Inasmuch as there are no connectors used for electric connection between the weighing apparatus 1 and the article feeder 41, it is not necessary to exercise care not to cover any connector with water when the weighing apparatus 1 and the article feeder 41 are washed with water.

While in the illustrated embodiment the light-emitting element 40 and the light detector 46 are employed, other devices for transmitting and receiving other signals such as radio-wave signals or sound signals may be employed in place of the light-emitting element 40 and the light detector 46.

Figure 5:
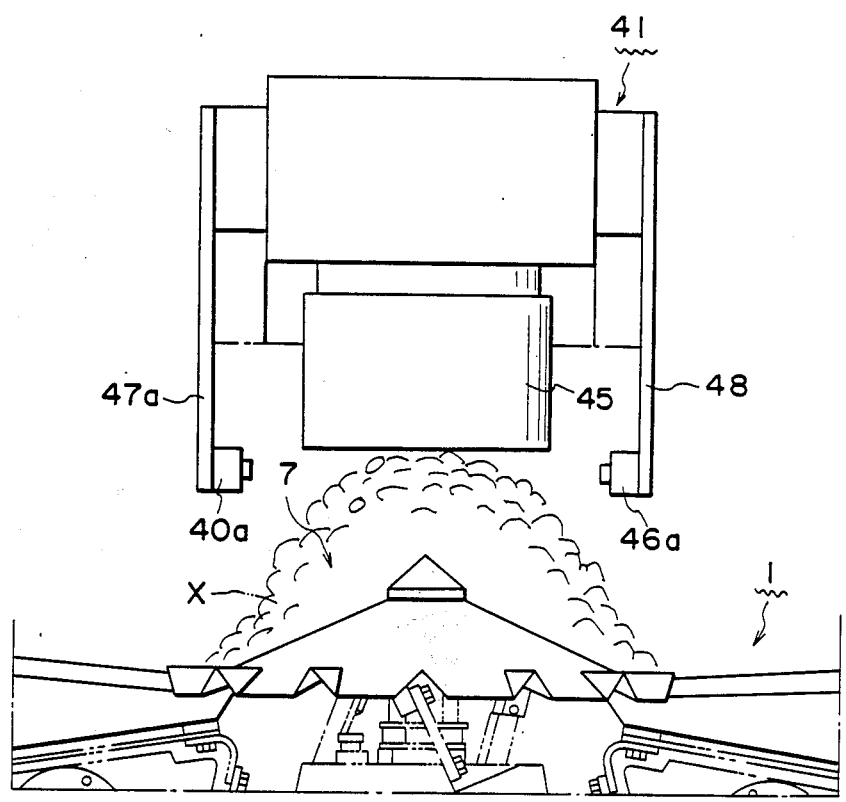
FIGS. 5 and 6 are fragmentary side elevational views of modifications of the present invention.
Figure 6:
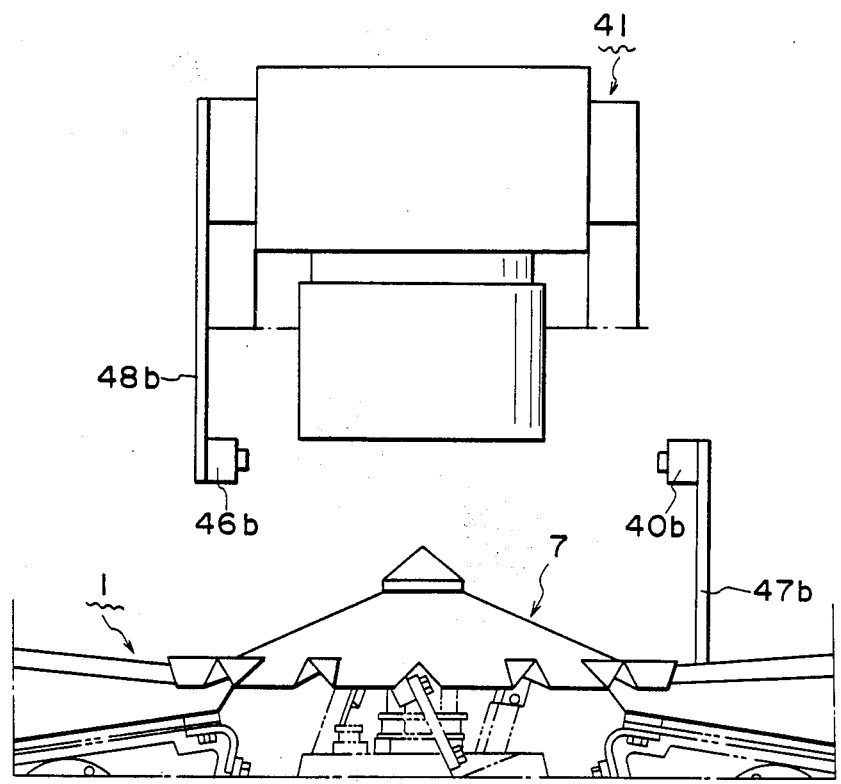

FIGS. 5 and 6 illustrate modifications according to the present invention. According to these arrangements, the quantity of articles pooled in the article pooling unit 7 is not detected by the load cell 36, but by a means for detecting the height of stacked articles in the article pooling unit 7.

In FIG. 5, a light-emitting element 40a and a light detector 46a are attached respectively to support members 47a, 48a disposed one on each side of the article charger 45 of the article feeder 41. The light-emitting element 40a and the light detector 46a are positioned in confronting relation to each other across the article pooling unit 7. When articles X pooled in the article pooling unit 7 are stacked to an increased height, light emitted from the light-emitting element 40a is blocked by the articles X. When the level of the stacked articles X is lowered below a prescribed height, light from the light-emitting element 40a falls on the light detector 46a to actuate the article feeder 41 to supply articles from the article feeder 41 into the article pooling unit 7.

In FIG. 6, a light-emitting element 40b is attached by a support member 47b to the weighing apparatus 1, and a light detector 46b is attached by a support member 48b to the article feeder 41. The light-emitting element 40b and the light detector 46b are disposed in confronting relation to each other across the article pooling unit 7. When the storage level of the articles in the article pooling unit 7 is reduced below a prescribed height, light emitted from the light-emitting element 40b impinges on the light detector 46b to operate the article feeder 41.

With the arrangements of FIGS. 5 and 6, the article feeder 41 which operates dependent on the condition of the articles pooled in the article pooling unit 7 is mechanically separated from the weighing apparatus 1.

Figure 7:
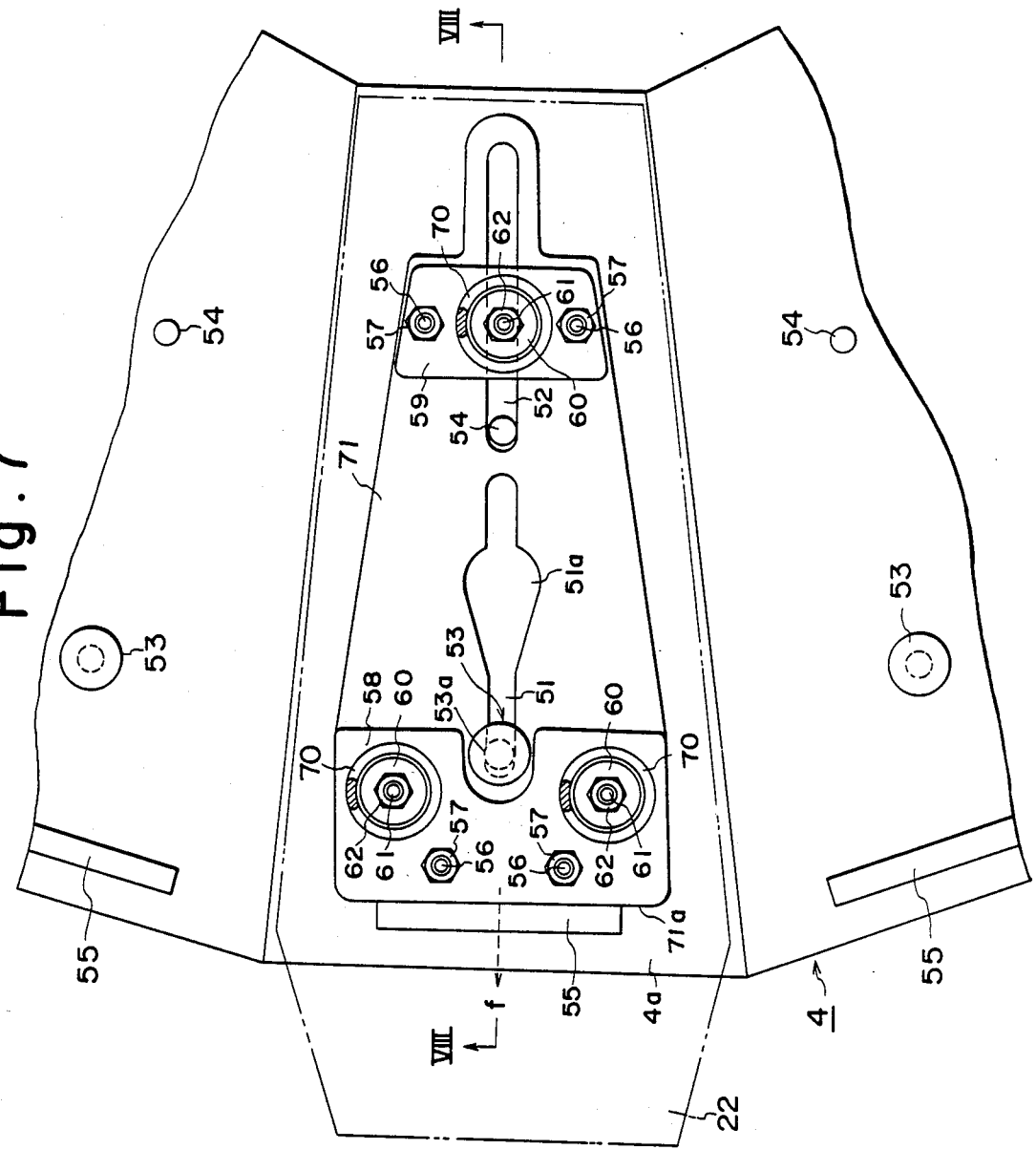
FIGS. 7 through 9 are diagrams illustrative of an embodiment composed of a second group of the embodiments of the present invention.
Figure 8:
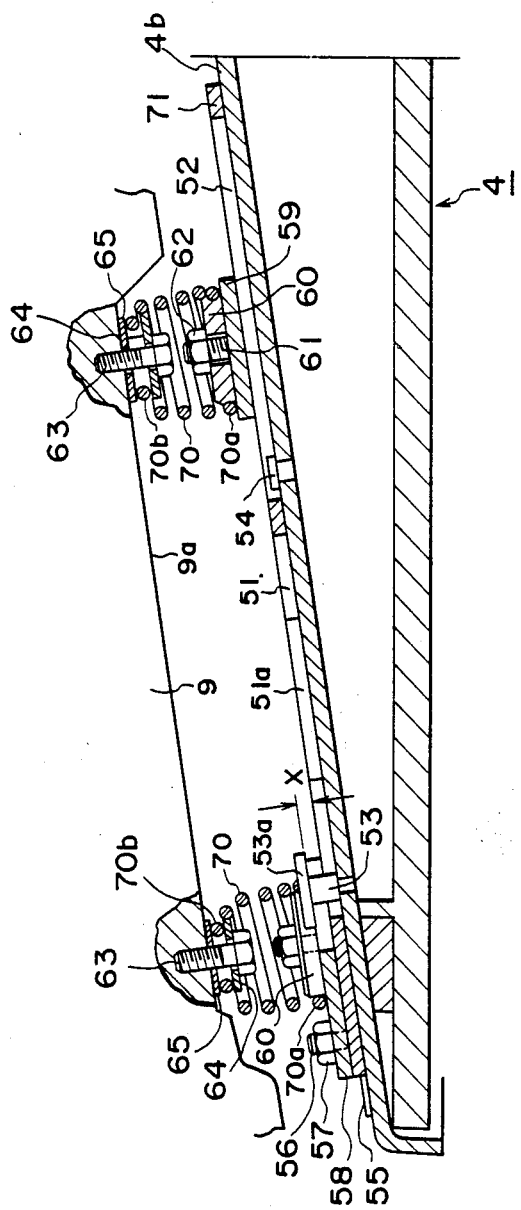
Figure 9:
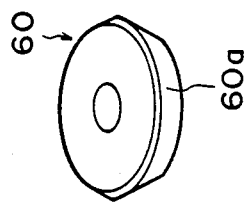

FIGS. 7 through 9 are diagrams illustrative of an embodiment composed of a second group of the embodiments of the present invention.

The embodiment described herein relates to a support structure for the supply trough 8. The vibrator 9 attached to the supply trough 8 therebelow is supported on the support table 4 by means of three coil springs 70. The support structure allows the vibrator 9 to be easily separated from the support table 4.

As illustrated in FIGS. 7 and 8, a base plate 7 of the embodimentl on which the coil springs 70 are supported has first and second slots 51, 52 extending along a central axis thereof. First and second engaging pins 53, 54 project from the upper surface 4b of the attachment base 4 on which the base plate 71 is placed, the first and second engaging pins 53, 54 engaging respectively in the slots 51, 52. The first engaging pin 53, which is located closely to the peripheral edge of the attachment base 4, has a head 53a greater than a smaller width of the first slot 51. The first slot 51 has an enlarged portion 51a for allowing the pin head 53a to pass therethrough. By slidably moving the base plate 71 outwardly in the direction of the arrow f (FIG. 7) until the enlarged portion 51a is positioned around the first engaging pin 53, the base plate 71 can be detached upwardly from the attachment base 4. With the base plate 71 positioned as illustrated, however, the first engaging pin 53 is displaced from the enlarged portion 51a of the first slot 51, thus preventing the base plate 19 from being detached from the attachment base 4. The second engaging pin 54 has a diameter slightly smaller than the width of the second slot 52 so that the second engaging pin 54 can be accommodated in the second slot 52. The upper surface 4b of the attachment base 4 is slanted, and the base plate 71 tending to slide outwardly on the slanted upper surface 4a is stopped by a stopper 55 projecting on the surface 4a. For removing the base plate 71, the base plate 71 is slightly lifted to clear the stopper 55. To allow the base plate 71 to be thus lifted, there is a certain clearance X between the head 53a of the first engaging pin 53 and the upper surface of the base plate 71 as shown in FIG. 8. Since the clearance X permits the base plate 71 to be lifted and slide, the second slot 52 may be a circular hole, and the second engaging pin 54 can be disengaged from such a circular plate when the base plate 71 is slid.

First and second spring seats 58, 59 are fixed to the upper surface of the base plate 71 at its opposite end portions by means of threaded studs 56 projecting upwardly from the base plate 71 and nuts 57 threaded over the threaded studs 56, respectively. Two spring engagement members 60, 60 are fixed to the first spring seat 58, and a single spring engagement member 60 is fixed to the second spring seat 59, by means of threaded studs 61 projecting upwardly from the first and second spring seats 58, 59 and nuts 62 threaded over the threaded studs 61. As shown in FIG. 9, each of the spring engagement members 60 is in the form of a circular plate having a peripheral surface 60a tapered with its diameter reduced progressively downwardly. The coil springs 70 interposed between the base plate 71 and the vibrator 9 have lowermost turns 70a engaging around the tapered peripheral surfaces 60a of the spring engagement members 60, respectively, and tightly held against the spring engagement members 60 under their own shrinking forces. The uppermost turns 70b of the coil springs 70 have a smaller coil diameter and are coupled to the lower surface 9a of the vibrator 9 by bolts 63 through washers 64. Shims 65 are interposed between the lower surface 9a of the vibrator 9 and the uppermost turns 70b of the coil spring 70 for adjusting the height and inclination of the supply trough 8.

The first spring seat 58 may be dispensed with, and the two spring engagement members 60 may be fixed directly to the base plate 71. In the event that the slot 52 is in the form of a circular hole, the second spring seat 59 may be dispensed with and the spring engagement member 60 may be fixed directly to the base plate 71.

Where articles to be weighed are food materials, and when it is necessary to wash the weighing hoppers 17 and the supply troughs 8 for sanitary purpose, or when inspecting the vibrators 9, the supply troughs 8 should sometimes be detached from the support table 4. The base plate 71 by which the supply trough 8 is supported on the support table 4 is fixed such that the first and second engaging pins 53, 54 engage respectively in the first and second slots 51, 52 with the end 71a engaged by the stopper 55. Therefore, when the supply trough 8 is to be detached, the base plate 71 is slightly lifted and slid forwardly in the direction of the arrow f (FIG. 7) until the enlarged portion 51a of the first slot 51 is positioned around the first engaging pin 53. The base plate 71 or the supply trough 8 can now easily be dismounted from the support table 4.

As described above, the base plate 71 and the vibrator 9 are coupled to each other by the coil springs 70, with the upper ends 70b of the coil springs 70 being fixed by the bolts 63 to the lower surface of the vibrator 9 and the lower ends 70a being fixed to the spring engagement members 60 secured to the base plate 71. Therefore, the supply trough 8 and the vibrator 9 can easily be detached simply by lifting the vibrator 9 or the supply trough 8 attached to the vibrator 9. The supply trough 8 can easily be attached to the support table 4 in the reverse process. Therefore, the supply troughs 8 can easily be attached to and detached from the support table 4.

It is necessary to adjust the height and inclination of each of the supply troughs 8 to allow articles to be fed smoothly down the supply troughs 8 or to avoid interference with the adjacent supply troughs. For such adjustment, the shims 65 can be tightened by the bolts 63 between the lower surface 9a of the vibrator 9 and the upper ends 70b of the coil springs 70. Since the shims 65 are selected to be of an optimum thickness, the bolts 63 are required to be loosened or tightened to meet the selected shims 65. As the bolts 63 are positioned inside the coil springs 70, it would be difficult to tighten or loosen the bolts 63 with the base plate 71 coupled to the lower ends of the coil springs 70. However, because the lower ends 70a of the coil springs 70 are held under their shrinking forces in engagement with the tapered peripheral surfaces 60a of the spring engagement members 60 fixed to the base plate 71, the lower ends 70a of the coil springs 70 can easily be separated from the spring engagement members 60 simply by forcing the coil springs 70 and the base plate 71 apart from each other. With the coil springs 70 and the base plate 71 separated from each other, it becomes possible to insert a tool through the coil springs 70 from the lower ends 70a for loosening or tightening the bolts 63. Accordingly, the shims 65 can easily be attached and detached, or the coil springs 70 and the vibrator 9 can easily be coupled to and separated from each other.

While in the above embodiment the lower ends 70a of the coil springs 70 are separable from the base plate 71, the upper ends 70b of the coil springs 70 may be separable from the vibrator 9 through the same arrangement as described above, or alternatively the upper and lower ends of the coil springs 70 may be separable from the vibrator 9 and the base plate 71.

While the illustrated embodiment is incorporated in the automatic weighing apparatus in which the weighing units 10 are arranged in a circular pattern, the principles of the invention may also be applicable to an automatic weighing apparatus in which a plurality of weighing units are arranged in a straight array, or to a single weighing unit.

FIGS. 10 through 14 are diagrams illustrative of an embodiment composed of a third group of the embodiments of the present invention. Those parts in FIGS. 10 through 14 which are identical to those shown in FIGS. 1 through 9 are denoted by identical reference characters and will not be described in detail.

The distributive table 6 comprises a downwardly opening tapered cone having a side surface inclined outwardly and downwardly to an extent much larger than that of the distributive table of conventional combinatorial weighing apparatus. The supply troughs 8 are disposed at spaced intervals around the distributive table 6 and inclined downwardly in the radially outward direction for allowing sticky articles to slide smoothly down the supply troughs 8. The supply troughs 8 are supported by the respective vibrators 9 on the support table 4.

Figure 10:
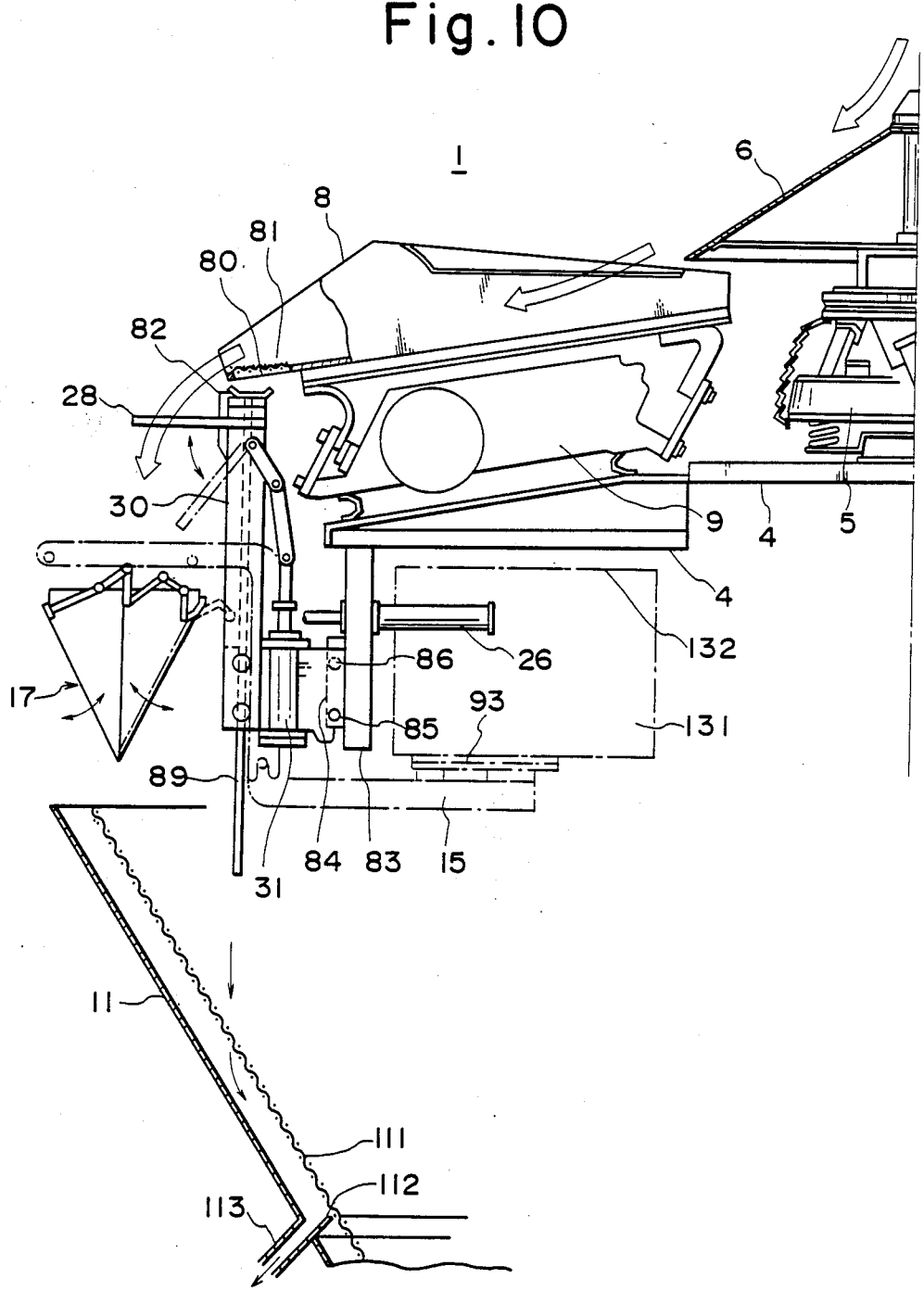
FIGS. 10 through 14 are diagrams illustrative of an embodiment composed of a third group of the embodiments of the present invention.
Figures 11, 12:
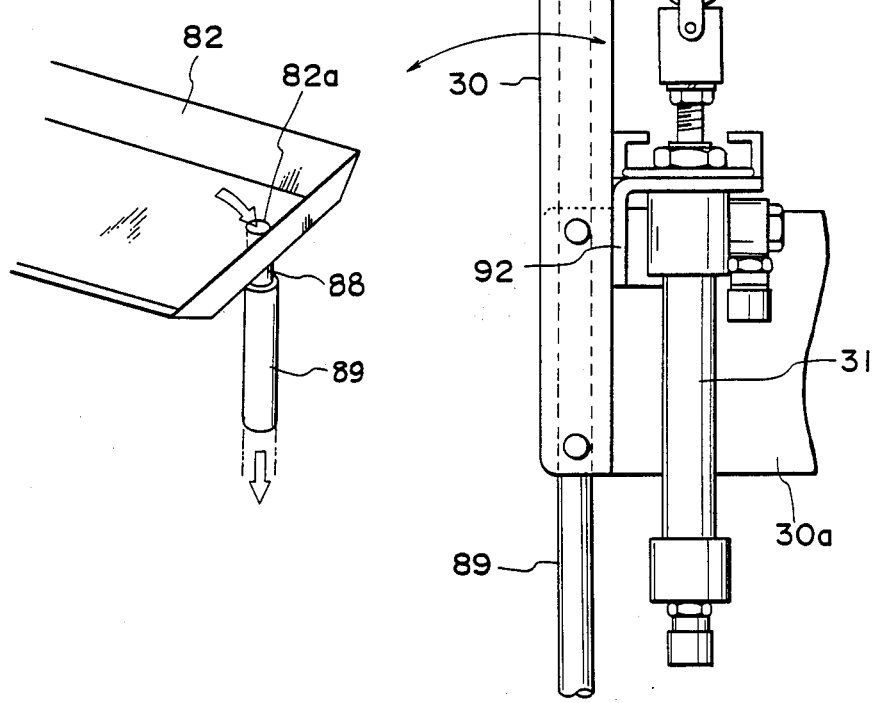
Figure 13:
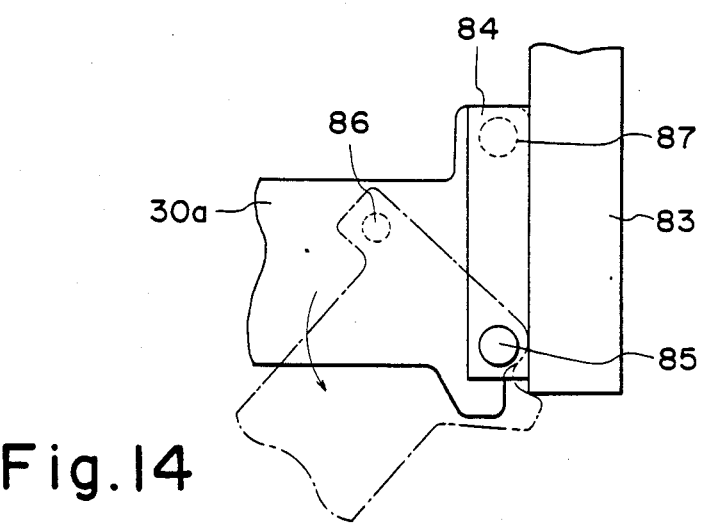
Figure 14:
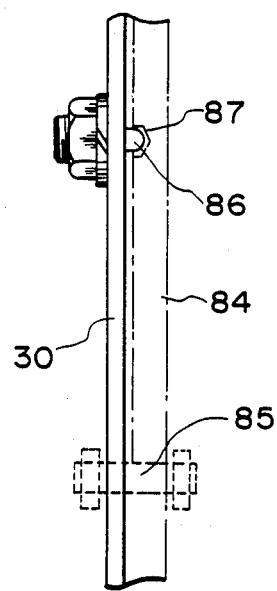

Each of the supply troughs 8 has a liquid drain hole 80 defined in the distal end of the slide surface thereof. The liquid drain hole 80 is covered with a net 81 extending flush with the slide surface of the supply trough 8 for allowing articles to slide over the net 81 toward the distal end of the supply trough 8 while draining the liquid accompanying the articles downwardly through the liquid drain hole 80. A tray 82 is positioned below the liquid drain hole 80. As shown in FIG. 10, the tray 82 is attached to the stand 30 supported by a bracket 84 on a support member 29 fixed to the support table 4. As illustrated in FIGS. 11 and 13, the stand 30 has its attachment member 30a pivotally supported by a pin 85 on the bracket 84 such that the attachment member 30a is tiltable through a prescribed angle defined by a stopper constituted by the lower end of the support member 29. As shown in FIGS. 13 and 14, the attachment member 30a is detachably connected to the bracket 84 through a detent means comprising a pushing ball 86 and a notch 87. The tray 82 mounted on the upper end of the stand 30 has a drain aperture 82a defined in one end thereof and connected to a short drain pipe 88 to which there is coupled a drain hose 89 serving as a liquid drain passage and extending downwardly along the stand 30. The drain hose 89 has a lower end positioned over an intermediate portion of the collection chute 11 disposed concentrically in the lower portion of the weighing apparatus.

As shown in FIG. 10, a net chute 111 in the form of a truncated cone is positioned within the collection chute 11 in spaced relation thereto. A ring-shaped barrier 112 is disposed between the collection chute 11 and the net chute 111 and connected to a drain pipe 113 for discharging the liquid from the drain pipe 88 and the drain hose 89 and the liquid from the collection chute 11.

As shown in FIG. 11, the plate-shaped shutter 28 having a wide area underlying the distal end of the supply trough is angularly movably attached to a bracket 90 fastened by a pin 91 to the upper portion of the stand 30. The shutter 28 is swingably movable between a horizontal closed position and a tilted open position. The lever 33 integral with the pin 91 is connected through the link 32 to the air cylinder 31 serving as an actuator and fixed to the stand 30 by a bracket 92.

A weighing means or unit 131 of a known construction housing the load cell 13 of FIG. 3 is fixedly disposed on a support table 4 below the vibrator 9 of each supply trough 8. The first support member 15 (FIG. 3) is coupled to the load cell in the weighing means 131 by a sealing rubber diaphragm 93 (FIG. 10).

The weighing means 131 has a case 132 including upper and side surfaces integral with each other, with the lower opening of the case 132 being fully sealed by the sealing rubber diaphragm 93. Therefore, the weighing mechanism in the weighing means 131 is resistant to a liquid dropping downwardly and washing water applied to the upper and side surfaces of the case 132.

The combinatorial weighing apparatus 1 will operate as follows: When the combinatorial weighing apparatus 1 starts to operate, sticky materials such as pickled vegetables or syruped materials are supplied together with their accompanying liquid from the article feeder 41 (FIG. 1) through the upper portion of the weighing apparatus 1 onto the central upper portion of the distributive table 6. The articles are then distributed equally radially outwardly into the supply troughs 8 as the distributive table 6 is vibrated upwardly and downwardly in circumferentially spiral motion.

The sticky articles supplied from the peripheral edge of the distributive table 8 into the supply troughs 8 can slide smoothly down the distributive table 6 and the supply troughs 8 since the conically tapered surface of the table 6 and the slide surfaces of the radial supply troughs 8 are inclined to a large extent.

The articles supplied into the supply trough 8 are then delivered downwardly from the distal end of the trough 8 into the weighing hopper 17 when the shutter 28 is swung from the horizontal closed position of FIG. 11 downwardly to the tilted open position by the air cylinder 31 through the link 32 and the lever 33 under the control of a computer (not shown).

The liquid accompanying the articles is allowed to pass through the net 81 and liquid drain hole 80 into the dray 82 disposed below the liquid drain hole 80. The drained liquid is then discharged from the tray 82 through the drain aperture 82a, the drain pipe 88, and the drain hose 89 into the collection chute 11. The discharge liquid as it passed through the net chute 111 is guided by the barrier 112 into the drain pipe 113, from which the liquid is drained into a container (not shown) on the base.

Therefore, the weighing hoppers 17 are supplied with only the articles substantially free from the sticky liquid.

When the weight of the articles charged from the supply troughs 8 into the weighing hoppers 17 reaches a prescribed weight, as determined by the dynamic weight measurement by the weighing hoppers 17, the supply troughs 8 stop vibrating under the control of a control unit (not shown), and the shutter 28 is lifted by the air cylinder 31 from the tilted open position to the horizontal closed position to prevent additional articles from dropping from the supply troughs 8 into the weighing hoppers 17.

Where the articles to be weighed are pickled or syruped materials wet with a liquid, their weights tend to vary, and hence the weights measured by the weighing hoppers 17 also tend to vary. However, such a condition is advantageous in combinatorial weighing operation.

The articles charged into the weighing hoppers 17 are weighed by the load cells 13 in the weighing means 131 which are coupled by the first support members 15 to the weighing hoppers 17. The detected weights are then processed by the control unit. More specifically, a preset number of the weighing hoppers 17 are employed to give weight data for combinatorial arithmetic operation, and an optimum added weight combination equal or closest to a prescribed target weight is selected.

Upon selection of such an optimum weight combination, those weighing hoppers 17 which are selected to give the weight combination by a non-illustrated controller are actuated by the air cylinders 26 to discharge the articles therefrom into the collection chute 11.

The weighing hoppers 17 which become empty by discharging the articles are then supplied with articles from the corresponding supply troughs 8 vibrated by the control unit while at the same time the air cylinders 31 are actuated by the control unit to move the corresponding shutters 28 downwardly to the tilted open position.

The articles charged into the collection chute 11 accompany a slight amount of sticky liquid, which can however be drained through the net chute 111 into the space between collection chute 11 and the net chute 111, and then guided by the barrier 112 into the drain pipe 113. The drained liquid is combined with the liquid drained through the drain hose 89 and discharged into the container or drain pan (not shown).

In the foregoing process, the articles are charged from the supply troughs 8 directly into the weighing hoppers 17 without the intermediary of pool hoppers which have conventionally been employed. An increase in the weight of the articles in the weighing hoppers 17 is detected by the corresponding weighing means 131 for controlling the magnitude and time interval of vibration of the supply troughs 8.

After the combinatorial weighing operation, the weighing system is washed with water supplied from above the system. Since the weighing means 131 for each of the weighing hoppers 17 is completely sealed in a watertight manner by the rubber diaphragm 93, the weighing means 131 is protected against entry of water.

The washing water applied to the supply trough 8 is drained through the liquid drain hole 80, the tray 82, and the drain pipe 88 to clean the entire passage along which the articles will slide during operation of the weighing system.

While the shutter 28, the tray 82, the lever 33, and the link 32 are being washed, the shutter 28 may be held in the open position to allow the weighing hopper 17 and the support member 15 to be washed with water.

The stand 30, on which the shutter 28, the tray 82, the lever 33, the link 32, and the air cylinder 31 are mounted, angularly movably attached to the support member 92 through the engagement of the pushing ball 86 in the notch 87. By forwardly tilting the stand 30 through disengagement of the pushing ball 86 from the notch 87, the stand 30 can efficiently and thoroughly be washed with water.

In the washing process, the weighing hopper 17 together with the second support member 16 of FIG. 3 can be separated from the weighing apparatus. The net chute 111 can be detached from the collection chute 11. By detaching net chute 111 and the collection chute 11, they can thoroughly be washed with water.

The articles which can be weighed by the weighing system of the present invention are not limited to the pickled articles or syruped materials, but may be dried fruits or cheese. Each of the weighing hoppers 17 may be openable on one side only. The actuators for opening and closing the shutter 28 and the weighing hopers may be motor-driven gear mechanisms rather than the air cylinders.

Although certain preferred embodiments have been shown and described, it should be understood that many changes and modifications may be made therein without departing from the scope of the appended claims.

What I claim is:

1. A weighing system comprising:
   a distributive table;
   a plurality of radial supply troughs disposed around the peripheral edge of said distributive table for being supplied with articles to be weighed from said distributive table;
   a plurality of weighing units supporting respective openable weighing hoppers for weighing articles supplied to said weighing hoppers;
   at least one of said distributive table and said radial supply troughs having a slide surface slanted radially outwardly to a large extent for allowing the articles to slide thereon;
   each of said radial supply troughs having a radially outer distal end disposed over one of said weighing hoppers;
   a collection chute disposed below said weighing hoppers; and
   a liquid drain device disposed at the distal end of each of said radial supply troughs.

2. A weighing system according to claim 1, wherein said liquid drain device comprises a tray disposed below said distal end of the radial supply trough.

3. A weighing system according to claim 2, wherein each of said radial supply troughs has a liquid drain hole disposed above said tray.

4. A weighing system according to claim 2, including a drain passage connected to said tray.

5. A weighing system according to claim 4, wherein said drain passage has a lower end disposed in said collection chute.

6. A weighing system according to claim 1, wherein said collection chute has a drain pipe, and further includes a net chute disposed in said collection chute.

7. A weighing system according to claim 1, including means for separably connecting said weighing hoppers to said weighing units, respectively.

8. A weighing system according to claim 1 which further includes:

an attachment base supporting at least said distributive table, said radial supply troughs, and said weighing units;

a base plate detachably mounted on said attachment base;

a plurality of coil springs disposed on said base plate;

a plurality of vibrators supported on said coil springs, said radial supply troughs being supported respectively on said vibrators; and said coil springs having ends separable from at least one of the upper surface of said base plate and the lower surface of each of said vibrators.

9. A weighing system according to claim 1, which further includes:

first means for detecting the amount of articles pooled on said distributive table and transmitting an output signal through space when the amount of articles as detected is reduced below a prescribed level; and said article feeder having second means for receiving said output signal from said first means to actuate said article feeder.

10. A weighing system according to claim 9, wheren said weighing apparatus includes a weight detector for detecting the weight of articles pooled on said distributive table, said first means being connected to said weight detector for transmitting said output signal when the detected weight of articles is reduce below said prescribed level.

11. A weighing system according to claim 9, wherein said first means comprises a light-emitting element and said second means comprises a light detector.

12. A weighing system comprising:

a distributive table;

a plurality of radial supply troughs disposed around the peripheral edge of said distributive table for being supplied with articles to be weighed from said distributive table;

a plurality of weighing units supporting respective openable weighing hoppers for weighing articles supplied to said weighing hoppers;

at least one of said distributive table and said radial supply troughs having a slide surface slanted radially outwardly to a large extent for allowing the articles to slide thereon;

each of said radial supply troughs having a radially outer distal end disposed over one of said weighing hoppers;

a collection chute disposed below said weighing hoppers; and a shutter interposed between the distal end of each of said radial supply troughs and a corresponding one of said weighing hoppers, and an actuator operatively coupled to said shutter for angular movement between open and closed positions.

13. A weighing system comprising:

a distributive table;

a plurality of radial supply troughs disposed around the peripheral edge of said distributive table for being supplied with articles to be weighed from said distributive table;

a plurality of weighing units supporting respective openable weighing hoppers for weighing articles supplied to said weighing hoppers;

at least one of said distributive table and said radial supply troughs having a slide surface slanted radially outwardly to a large extent for allowing the articles to slide thereon;

each of said radial supply troughs having a radially outer distal end disposed over one of said weighing hoppers;

a first liquid drain device disposed at the distal end of each of said radial supply troughs;

a shutter interposed between the distal end of each of said radial supply troughs and a corresponding one of said weighing hoppers;

a stand including a second liquid drain device for draining a liquid from said radial supply troughs; and a collection chute disposed below said weighing hoppers.

14. A weighing system according to claim 13, wherein said stand is angularly movable between an upright position and a tilted position.

15. A weighing system according to claim 14, including a stopper for limiting said tilted position of said stand.

* * * * *

UNITED STATES PATENT AND TRADEMARK OFFICE
CERTIFICATE OF CORRECTION

PATENT NO. : 4,683,966

DATED : Aug. 4, 1987

INVENTOR(S) : NAKAGAWA et al.

It is certified that error appears in the above-identified patent and that said Letters Patent is hereby corrected as shown below:

Col. 1

Line 34, delete "artices" and insert --articles--;
Line 38, delete "Heretore" and insert --Heretofore--;
Line 51, delete "foreget" and insert --forget--.

Col. 3

Line 52, delete "weighting" and insert --weighing--.

Col. 14

Line 4, delete "92" and insert --29--.

Col. 15

Line 28, delete "reduce" and insert --reduced--.

Signed and Sealed this

Sixteenth Day of February, 1988

Attest:

DONALD J. QUIGG

Attesting Officer

Commissioner of Patents and Trademarks